US010354286B1

(12) United States Patent
Walker

(10) Patent No.: US 10,354,286 B1
(45) Date of Patent: Jul. 16, 2019

(54) DIGITAL PROMOTIONS SYSTEM INCLUDING USER-CRAVING PROFILE AND UPCOMING EVENT BASED DIGITAL PROMOTION AND RELATED METHODS

(71) Applicant: Carolina Coupon Clearing, Inc., Winston-Salem, NC (US)

(72) Inventor: Jess D. Walker, Georgetown, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 262 days.

(21) Appl. No.: 15/291,479

(22) Filed: Oct. 12, 2016

(51) Int. Cl.
G06Q 30/02 (2012.01)
G06Q 50/00 (2012.01)
G06Q 10/10 (2012.01)

(52) U.S. Cl.
CPC ....... G06Q 30/0269 (2013.01); G06Q 10/109 (2013.01); G06Q 30/0252 (2013.01); G06Q 30/0255 (2013.01); G06Q 30/0261 (2013.01); G06Q 30/0267 (2013.01); G06Q 50/01 (2013.01)

(58) Field of Classification Search
None
See application file for complete search history.

(56) References Cited

U.S. PATENT DOCUMENTS

| 8,660,892 B2 | 2/2014 | Subhan | |
| 2007/0197247 A1* | 8/2007 | Inselberg | G06Q 30/02 455/517 |
| 2008/0275786 A1 | 11/2008 | Gluck | |
| 2011/0270662 A1* | 11/2011 | Rocco | G06Q 30/02 705/14.27 |
| 2012/0030048 A1 | 2/2012 | Manley et al. | |
| 2012/0259705 A1 | 10/2012 | Monteverde | |
| 2013/0046603 A1* | 2/2013 | Grigg | G06Q 30/0261 705/14.25 |
| 2013/0159076 A1* | 6/2013 | Heisler | G06Q 30/02 705/14.12 |
| 2013/0254007 A1 | 9/2013 | Cockcroft | |
| 2013/0311255 A1 | 11/2013 | Cummins et al. | |
| 2014/0195357 A1 | 7/2014 | Pollack | |
| 2014/0351039 A1 | 11/2014 | Chiang et al. | |
| 2015/0106183 A1 | 4/2015 | McEvilly et al. | |
| 2015/0112799 A1 | 4/2015 | Lumer et al. | |

(Continued)

OTHER PUBLICATIONS

BetNow website (retrieved at https://www.betnow.eu/sportsbook-info/live-betting-football-rules in 2015).*

Primary Examiner — James M Detweiler
(74) Attorney, Agent, or Firm — Allen, Dyer, Doppelt + Gilchrist, P.A. Attorneys at Law

(57) ABSTRACT

A digital promotion system may include a mobile wireless communications device and a digital promotions server. The digital promotions server may include a memory configured to store digital promotions, and a processor coupled thereto. The processor may harvest historical user data that includes historical purchase data, historical geographic location data based upon the mobile wireless communications device, and historical social media data, and determine a user-craving profile based upon the harvested historical user data. The processor may determine an upcoming event for the user, and select a corresponding digital promotion for the user based upon the user-craving profile and the upcoming event.

14 Claims, 7 Drawing Sheets

(56) References Cited

U.S. PATENT DOCUMENTS

| | | | |
|---|---|---|---|
| 2015/0120453 A1* | 4/2015 | Lee .................... | G06Q 30/0261 705/14.58 |
| 2015/0220983 A1* | 8/2015 | Chauhan ............ | G06Q 30/0255 705/14.53 |
| 2016/0148238 A1* | 5/2016 | He .................... | G06Q 30/0207 705/14.1 |
| 2017/0161784 A1* | 6/2017 | Malik ................ | G06Q 30/0261 |

* cited by examiner

DIGITAL PROMOTIONS SYSTEM INCLUDING USER-CRAVING PROFILE AND UPCOMING EVENT BASED DIGITAL PROMOTION AND RELATED METHODS

TECHNICAL FIELD

The present invention relates to the field of electronics, and more particularly, to the processing of digital promotions and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, size of the product in terms of packaging, and/or the price point of the given item.

One particular type of discount or promotion is a flash sale. A flash sale is a discount or promotion offered, for a relatively short period of time compared to other discounts or promotions. Generally, the quantity of available discounts or available products is limited, which corresponds to relatively higher than typical promotional values. The shortened time frame for redemption of the promotions may play to a consumer's impulse response, that is the customer may purchase the product as an impulse purchase.

U.S. Pat. No. 8,660,892 to Subhan, for example, discloses generating a coupon that has a time of validity that is much shorter than conventional coupons thus achieving an immediate call to action. U.S. Patent Application No. 2008/0275786 to Gluck discloses a countdown timer for a given online incentive. U.S. Patent Application No. 2013/0254007 to Cockcroft discloses a flash sale system in which users are ranked.

SUMMARY

A digital promotion system may include a mobile wireless communications device, and a digital promotions server. The digital promotions server may include a memory configured to store digital promotions, and a processor coupled thereto. The processor may be configured to harvest historical user data that includes historical purchase data, historical geographic location data based upon the mobile wireless communications device, and historical social media data, and determine a user-craving profile based upon the harvested historical user data. The processor may also be configured to determine an upcoming event for the user, and select a corresponding digital promotion for the user based upon the user-craving profile and the upcoming event. Accordingly, the digital promotions system may more accurately select a corresponding digital promotion for the user, which may increase chances of redemption, for example.

The processor may be configured to determine the upcoming event based upon a digital calendar entry associated with the user. The mobile wireless device may include a display, and the processor may be configured to communicate the selected corresponding digital promotion for display on the display of the mobile wireless communications device, for example. The processor may be configured to communicate the selected corresponding digital promotion for display within a threshold time period prior to a start of the upcoming event, for example.

The processor may be configured to determine an end-time for the upcoming event and set an expiration of the corresponding digital promotion based upon the determined end-time. The mobile wireless communications device may be configured to determine a current geographic location thereof and communicate the geographic location to said digital promotions server, and wherein the processor may be configured to determine the upcoming event based upon the current geographic location, for example.

The processor may be configured to generate the user-craving profile by correlating the historical purchase data, the historical geographic location data, and the historical social media data for predicting a likelihood that a product is to be purchased at a given time and a given location. The processor may be configured to generate a user-craving score corresponding to an amount of correlated historical purchase data, historical geographic location data, and historical social media data, and select the corresponding digital promotion to have a promotional value based upon the user-craving score, for example.

The upcoming event may have an outcome associated therewith, such as a sporting event. The mobile wireless communications device may include an input device, and the processor may be configured to receive a predicted outcome of the upcoming event based upon said input device and select the corresponding digital promotion to have a promotional value based upon the predicted outcome relative to the outcome of the upcoming event, for example. The processor may generate the user-craving profile based upon at least one of gender, age of the user, and household income.

A method aspect is directed to a method of processing a digital promotion. The method may include using a processor coupled to a memory configured to store a plurality of digital promotions to harvest historical user data comprising historical purchase data, historical geographic location data based upon a mobile wireless communications device, and historical social media data. The method may also include using the processor to determine a user-craving profile based upon the harvested historical user data, determine an upcoming event for the user, and select a corresponding digital promotion for the user based upon the user-craving profile and the upcoming event.

A related aspect is directed to a non-transitory computer readable medium for performing operations of the digital promotions server.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
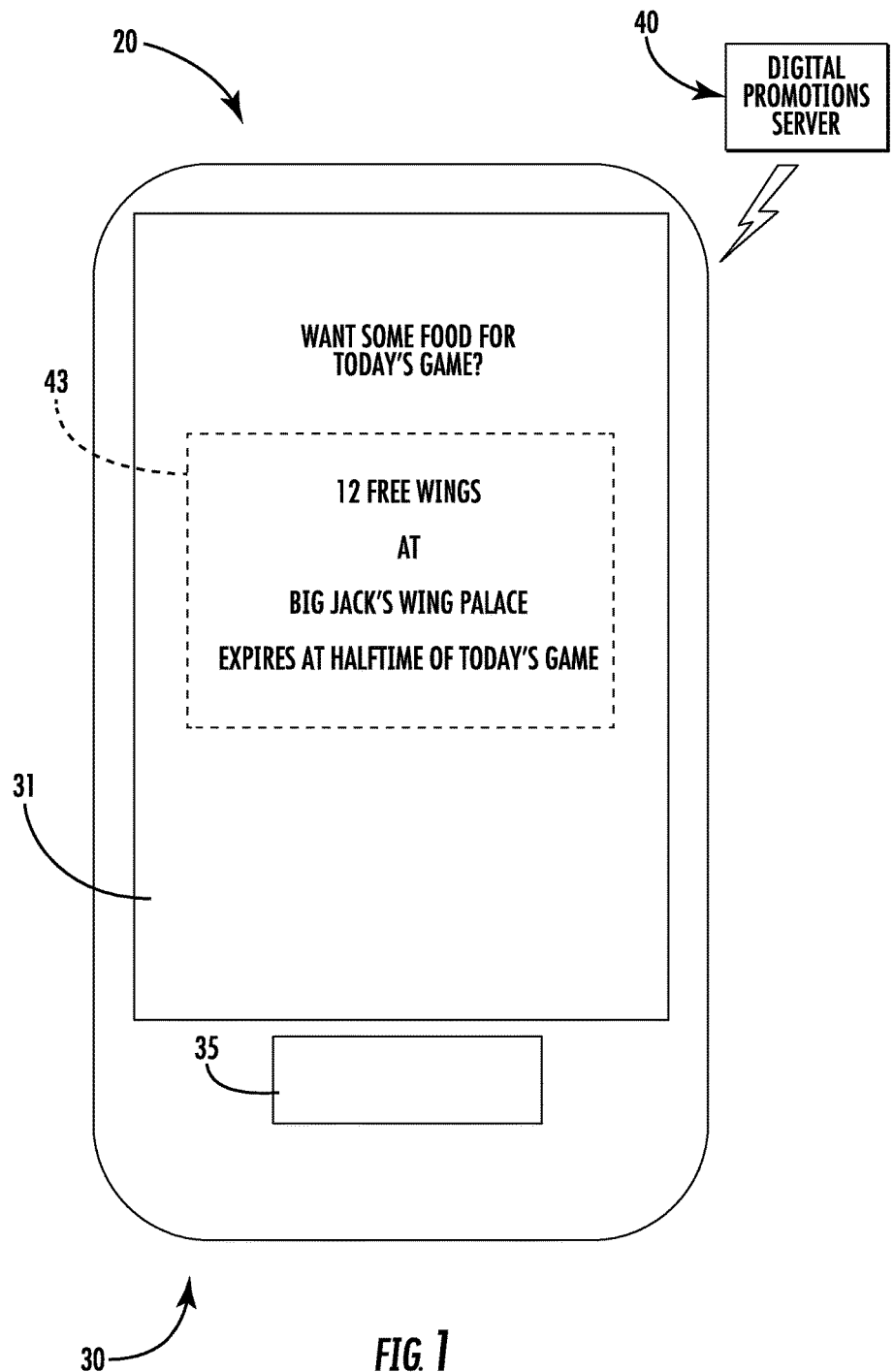
FIG. 1 is a diagram of a digital promotions system illustrating a display of a mobile wireless communications device in accordance with an embodiment.
Figure 2:
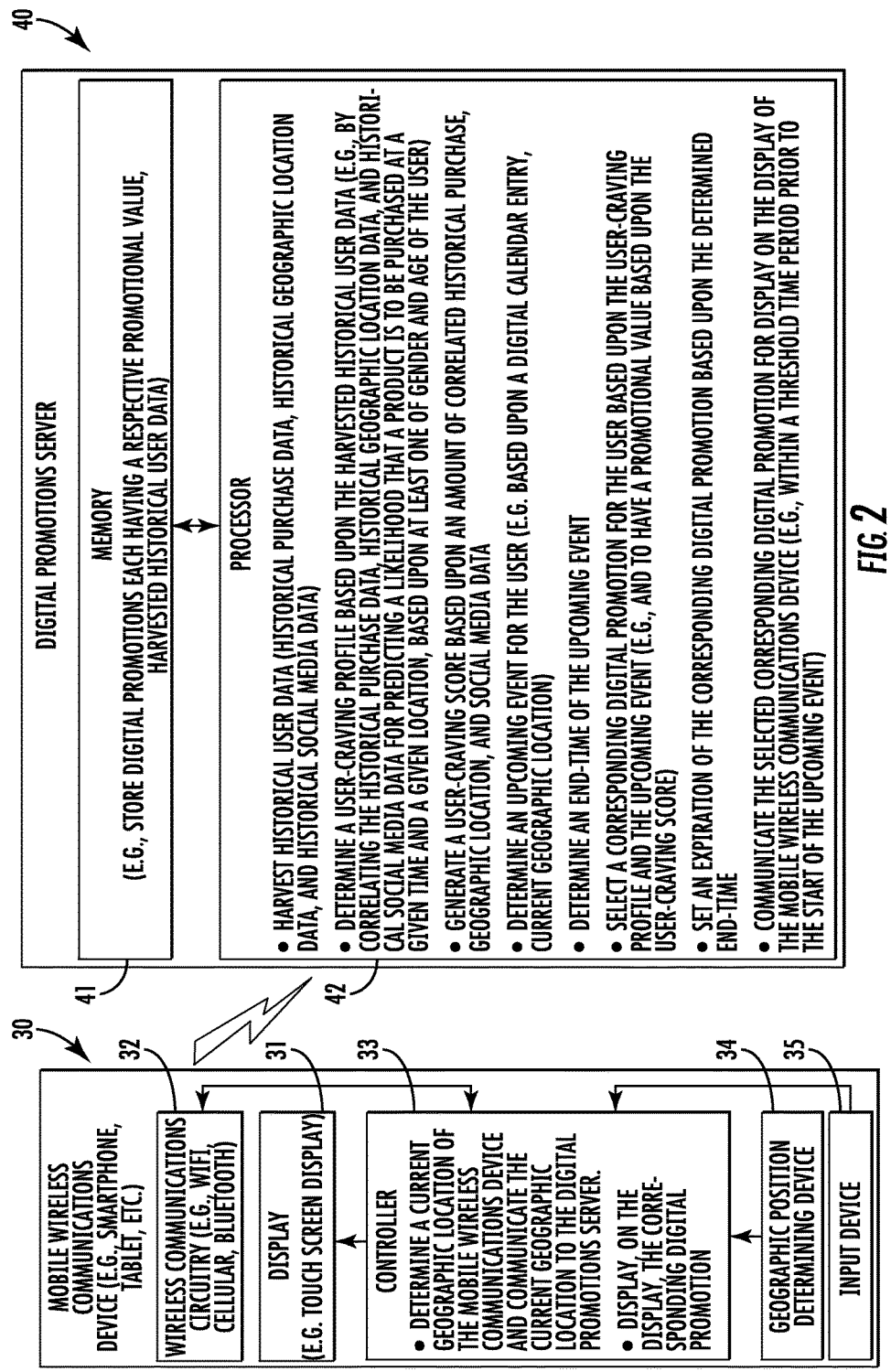
FIG. 2 is a schematic diagram of the digital promotions system of FIG. 1.
Figure 3:
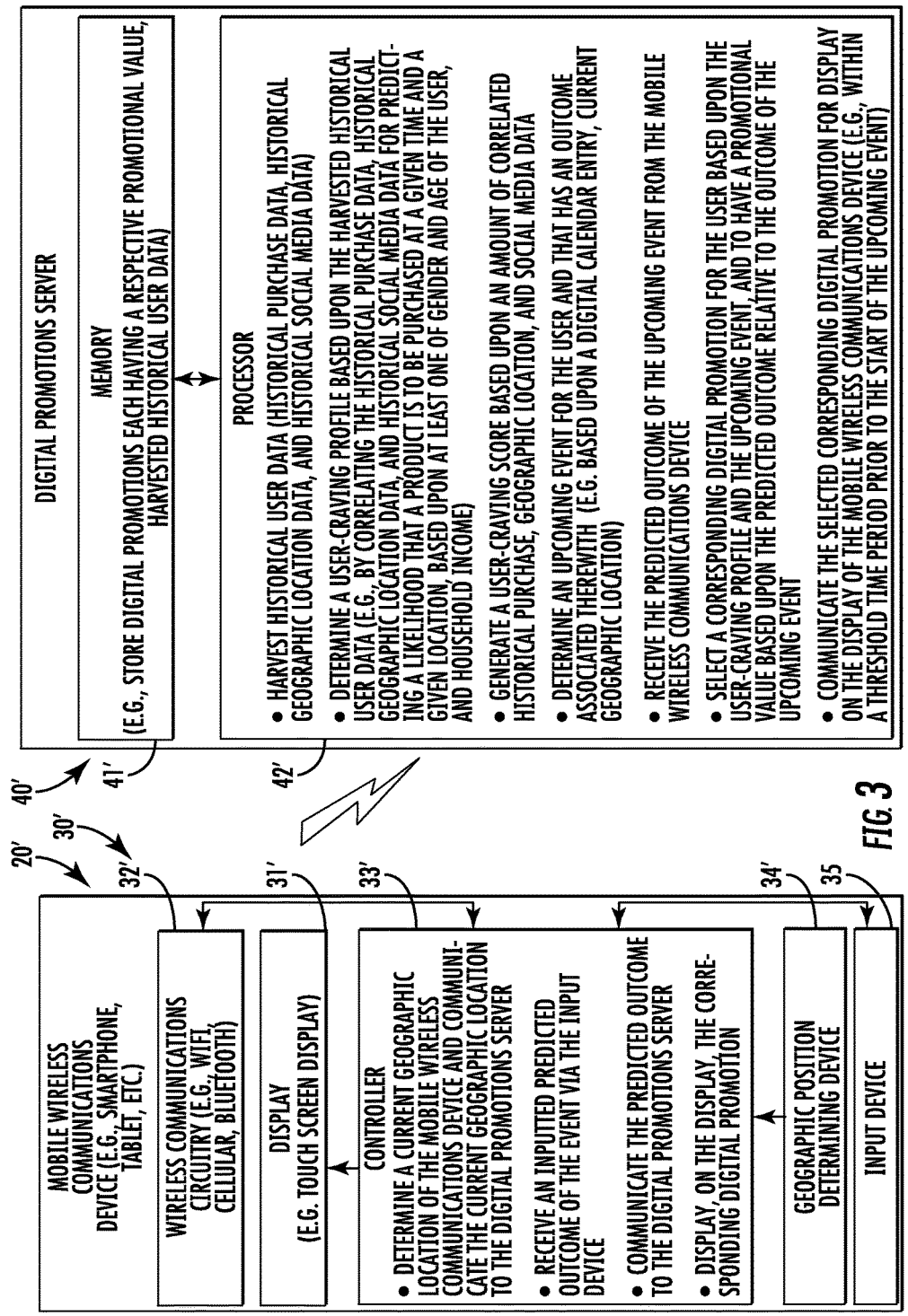
FIG. 3 is a schematic diagram of the digital promotions system in accordance with another embodiment.

Referring initially to FIGS. 1-2, a digital promotion system 20 includes a mobile wireless communications device 30. The mobile wireless communications device 30 is illustratively in the form of a mobile telephone or smartphone and includes a display 31, wireless communications circuitry 32, and a controller 33 coupled to the display and the wireless communications circuitry. The mobile wireless communications device 30 also includes a geographic position determining device 34 coupled to the controller 33 and cooperating therewith to determine a geographic location of the mobile wireless communications device. The mobile wireless communications device 30 also includes an input device 35 coupled to the controller 33. The input device 35 may be in the form of a pushbutton switch, for example, an input portion of a touch display, or other input device. There may be more than one input device 35. While a smart phone is illustrated, it will be appreciated by those skilled in the art that the mobile wireless communications device 30 may be another type of device, for example, a tablet, laptop, etc.

The digital promotion system 20 also includes a digital promotions server 40. The digital promotions server 40 includes a memory 41 for storing digital promotions, and a processor 42 coupled thereto. The digital promotions server 40 is communicatively coupled to the mobile wireless communications device, for example, via one or more communications networks, either or both of wired and wireless. In other words, the digital promotions server 40 is remote (e.g., physically separated from) the mobile wireless communications device 30.

The processor 42 of the digital promotions server 40 harvests historical user data from one or more data sources. More particularly, the processor 42 may process product purchase information for a given user, for example during a checkout process and store this information in the memory 41 along with payment information, time, date, location, etc., and/or other data that may be associated with a retailer loyalty program, for example.

The processor 42 may also harvest and store in the memory 41 historical geographic location data of the user, for example, based upon the mobile wireless communications device 30, and more particularly, the geographic position determining device 34. The historical geographic location data may be communicated from the mobile wireless communications device 30 or harvested from purchase transactions (i.e., locations at which the purchase transactions were made), for example, from a loyalty program and/or from financial institution information. Calendar data associated with the user may be used to harvest historical geographic location data.

The processor 42 may also harvest and store in the memory 41 historical social media data. For example, the processor 42 may harvest postings to a social media website, likes, comments, photographs, etc. associated with the user. The processor 42 may communicate with the social media server based upon the user's credentials, or the processor 42 may communicate via social media apps stored on the mobile wireless communications device 30. In some embodiments, the processor 42 may also harvest and store in the memory 41 historical web browsing data, for example, for a web browser.

The processor 42, based upon the above-described historical data, generates a user-craving profile, for example, by correlating the stored historical purchase data, the historical geographic location data (e.g., including a time of day correlation), and the historical social media data. In some embodiments, the historical geographic location data may alternatively or additionally be provided by application on the mobile wireless communications device 30 or by the user. The user-craving profile may be considered a representation of what a given user purchases or activities in which they participate, and at which days and times they purchase and/or participate. The processor 42 may use correlated data or user-craving profile for predicting a likelihood that a product, or service, is to be purchased at a given time and at a given location. Other and/or additional factors may be considered in determining the user-craving profile, for example, gender, age, household income, and/or the historical browsing data. The user-craving profile may also include an activity level relative to the product purchases and level of activities. For example, the activity level may be determined based upon how much of given product the user purchases, or how many social media posting that may exist relative to an event.

The user-craving profile may include a user-craving score, for example. The user-craving score may be determined by the processor 42 based upon the amount of correlated historical purchase data, historical geographic location data, and historical social media data. For example, a larger user-craving score may be the result of a larger amount of correlated historical data.

A specific implementation example will now be described. A given user may be a male college football fan. The given user, during the college football season, typically buys beverages prior to each game of their favorite team and orders pizzas and wings during the game when they are not physically at the game. The given user may post on social media news feeds, photos, or "likes" with respect to the favorite team, and the amount of social media postings increases around game-time. The above-data is harvested by the processor 42, which generates the user-craving profile, which in this example, may include data representative that the given user may highly desire football-type foods and beverages, and other products surround the favorite team and around game times, and the amount thereof. The user-craving profile may include a user-craving score, which may be indicative of how fanatical about football the user may be, for example. A value of a corresponding digital promotion may be determined based upon the user-craving score, i.e., the higher the score, the greater the value of the digital promotion.

The processor 42 may also be configured to determine an upcoming event for the user. For example, the processor 42 may communicate with a calendar associated with the user and harvest digital calendar entries for determining the upcoming event. The calendar may be a cloud-based calendar and/or a calendar application on the mobile wireless communications device 30. Of course, the processor 42 may harvest other and/or additional data to build a calendar or determine the upcoming event for the user.

The processor 42 may also determine an upcoming event for the user based upon a current location of the user communicated, e.g., wirelessly, from the geographic position determining device 34. The processor 42 may determine that based upon the current geographical location of the user, the user is likely going to be participating in or be associated with a particular upcoming event.

With respect to the football game implementation example above, the processor 42 may harvest and determine that the user will be attending a football game in the upcoming weekend. The calendar related data harvested may include time, date, location, invitees, and/or other additional comments as may be included in a digital calendar entry, as will be appreciated by those skilled in the art. Moreover, the processor 34 may determine that the user is, based upon the geographical location of the mobile wireless communications device 30, going to the upcoming event, which may or may not also be determined based upon the calendar data.

The processor 42 may also determine an end-time for the upcoming event. The end-time may be determined based upon the digital calendar entry, for example. The end-time may also be determined based upon an Internet look-up of an estimated time period for the given event. The processor 42 may set an expiration of corresponding digital promotions based upon the end-time, for example, prior to the determined end time.

The processor 42, based upon the user-craving profile and the upcoming event, selects a corresponding digital promotion for the user. More particularly, the digital promotions server 40, for example, a threshold time period prior to the start of the upcoming event, for example, an hour, may communicate the digital promotion to the mobile wireless communications device 30 for display on the display 31. Of course, the threshold time period prior to the event for communicating and/or displaying the digital promotion may be set to a different amount of time. The digital promotion may then be redeemed by the user or stored in a digital wallet for future redemption, but within a threshold time period. In some embodiments, the digital promotion may be in the form of a rebate applicable to or applying a discount to a past purchase, the rebate to be processed in accordance with the embodiments described herein.

With respect to the football example described above, the user may be sent a digital promotion 43 for display on the display 31 of the mobile wireless communications device 30 one-hour prior to the start of a football game. The digital promotion 43 may be for 12 free wings with a large pizza purchase. Of course, the digital promotion 43 may be different based upon the user-craving profile and the promotional values may be different based upon the user-craving score. The digital promotion 43 may expire at halftime or about halfway to the scheduled end-time of football game. More than one digital promotion may be sent and displayed. As will be appreciated by those skilled in the art, given time sensitivity of the digital promotion relative to the upcoming event, and the amount of "impulse" for each item or product to be purchased, the promotional value of each digital promotion may be larger, yet the valid time period smaller, relative to other types of digital promotions.

While a football game example implementation has been described, it will be appreciated that the digital promotions system may be particularly useful in other "craving" applications. For example, a pregnant woman may develop a pattern of purchasing milkshakes near midnight. The digital promotions system 20 may determine this pattern (i.e., an upcoming event) through harvesting and the generated user-craving profile, as described above. The digital promotions system 20 may then select a milkshake digital promotion, for example, a free size upgrade, that is communicated and displayed at 11 pm and expires at 1 a.m. A similar approach, in another example, may be for a particular fast food restaurant, wherein a digital promotion is communicated at 2 a.m. and valid until 3 a.m., as determined by the digital promotions server 40 and corresponding to the close of bars (i.e., after an evening of drinking).

Figure 4:
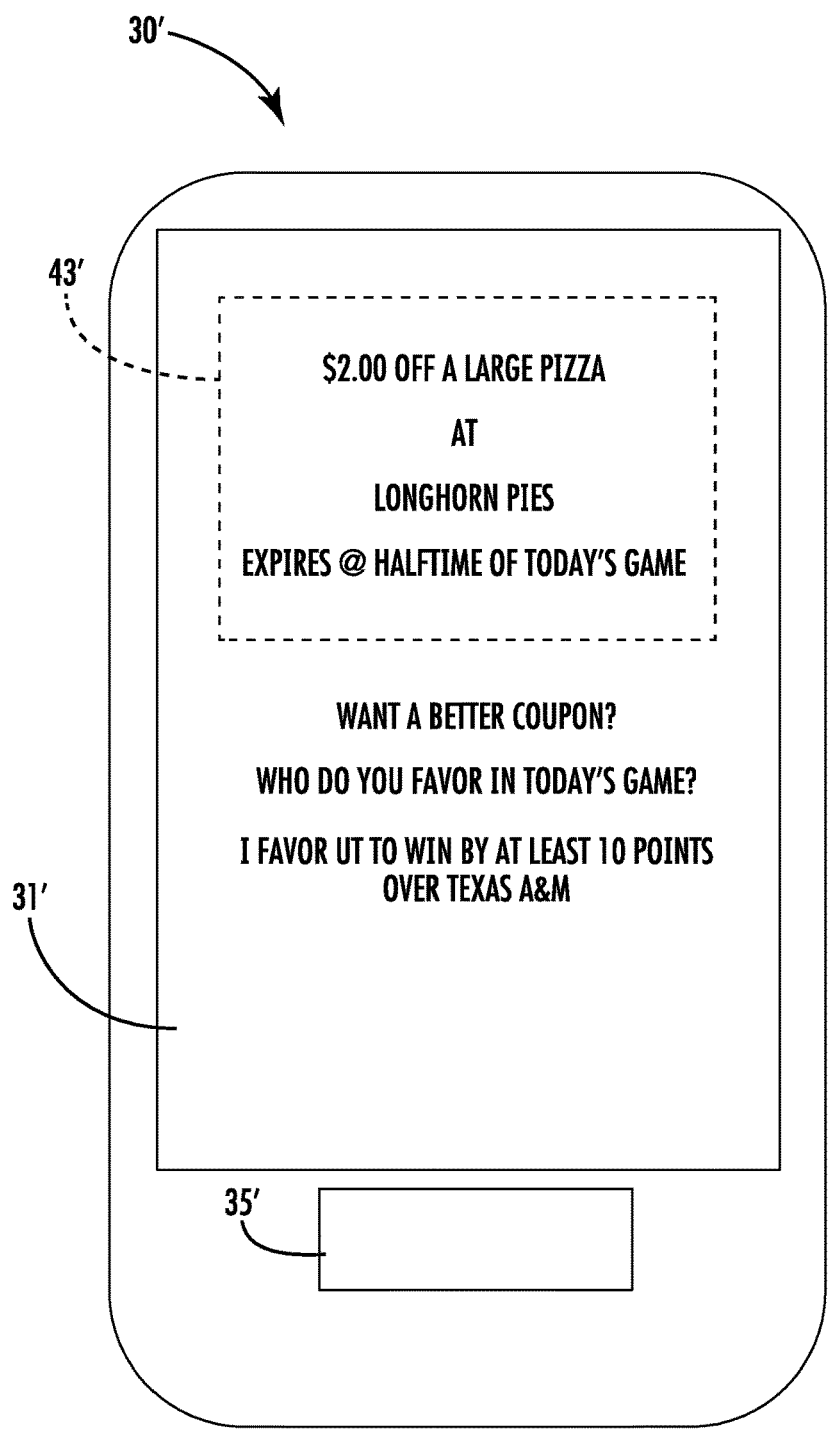
FIG. 4 is a diagram illustrating a display of a mobile wireless communications device of a digital promotions system of FIG. 3 illustrating a digital promotion.
Figure 5:
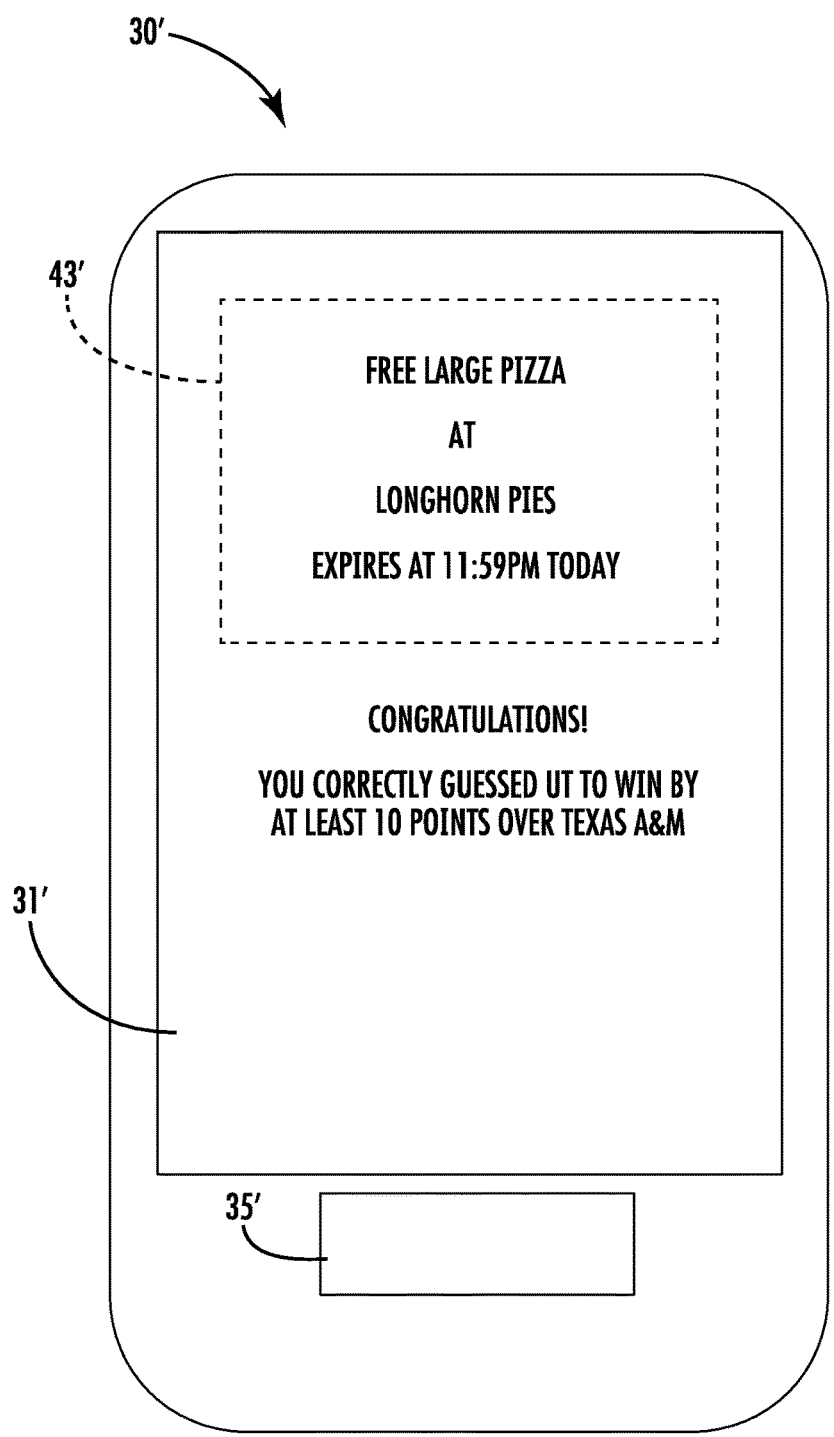
FIG. 5 is the display of the mobile wireless communications device of FIG. 4 after correct prediction of the outcome of an upcoming event.
Figure 6:
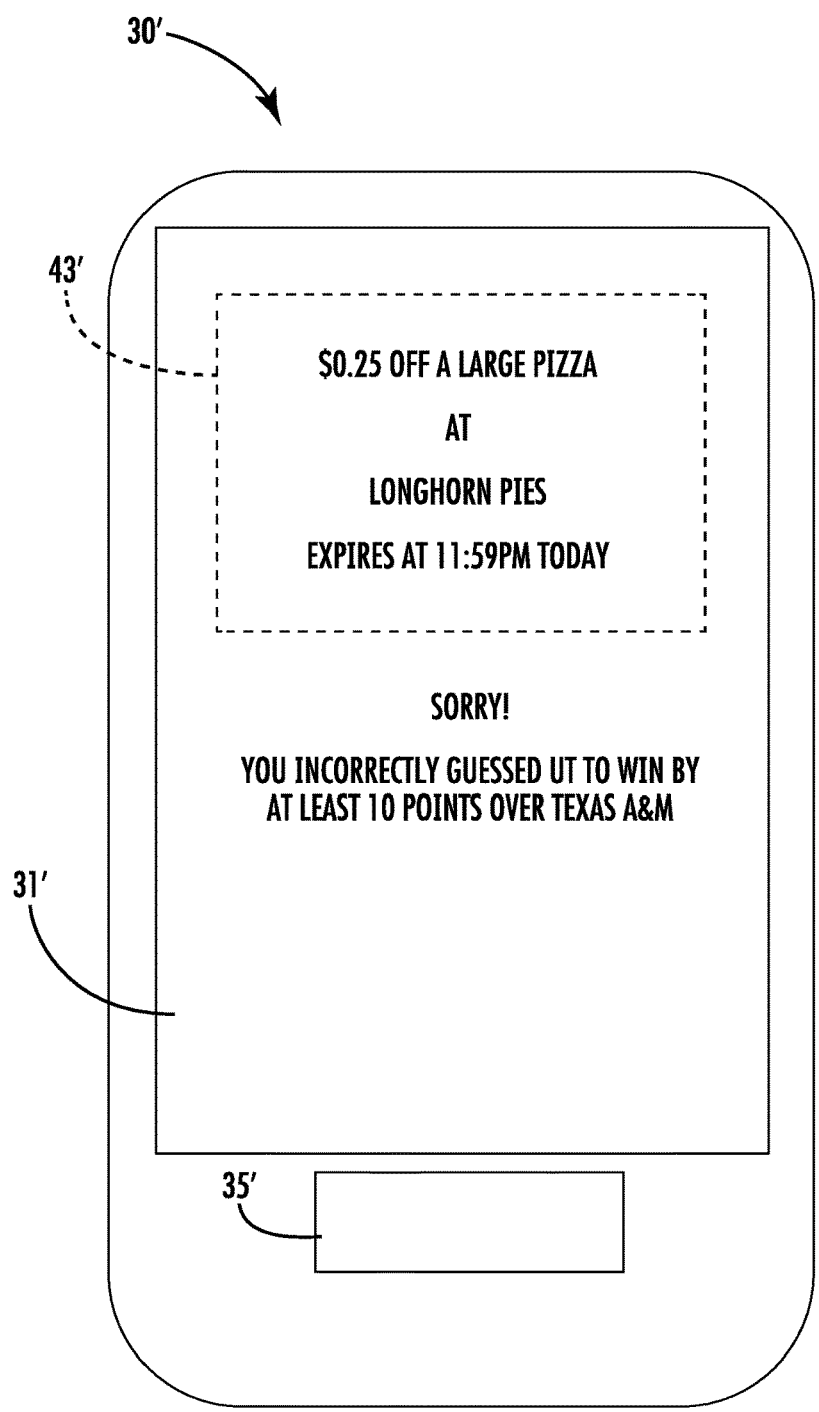
FIG. 6 is the display of the mobile wireless communications device of FIG. 4 after incorrect prediction of the outcome of an upcoming event.

Referring now to FIGS. 3-6 in another embodiment, the upcoming event has an outcome associated therewith. For example, and with reference to the football game implementation example, the user's favorite team may or may not win the game (i.e., the outcome). The user's favorite team may be a favorite or an underdog, for example, by a threshold score, i.e., a spread. In the present embodiment, the user may, via the user input device 35', input a predicted outcome of the upcoming event (FIG. 4). The predicted outcome is communicated, for example, wirelessly, to the digital promotions server 40'. The digital promotions server 40' receives the predicted outcome, and the processor 42' selects the corresponding digital promotion 43' to have a promotional value that is based upon the predicted outcome. In other words, through interaction with the user, the selection of the digital promotion 43' may be gamified. If the user correctly predicts the outcome of the upcoming event, then the promotional value of the corresponding digital promotion may be increased. If, in the football game example, the user correctly predicts their favorite team wins the games, the promotional value of the corresponding digital promotion 43' may be increased (FIG. 5), for example. The digital promotion 43' may have a value that changes based upon other factors, for example, if the user correctly predicts the outcome of the game considering the spread, the promotional value may be tripled. The communication of the digital promotion 43' may be held in abeyance pending the outcome of the upcoming event relative to the predicted outcome. In other words, the digital promotion information may be communicated prior to an outcome being reached in the upcoming event, and communicated, if at all, at the end-time of the event or upon the outcome. In some embodiments, the digital promotion information may not be communicated at all ahead of the outcome of the upcoming event. Of course, other values may be assigned to correct prediction of the outcome both with and without consideration of a spread.

On the other hand, if the user incorrectly predicts the outcome of the upcoming event, e.g., the football game, the promotional value of the corresponding offer may be decreased (FIG. 6), for example, to a fraction of the originally presented digital promotion, or even zero (i.e., no value or no discount). It should be appreciated that in this embodiment, the expiration of the corresponding digital promotion 43' may be set by the controller 42' to be later than the end of the determined end-time of the upcoming event.

As will be appreciated by those skilled in the art, the digital promotions system 20 may be particularly desirable as it improves the processing of digital promotions. By harvesting the historical user data as described above, and considering events associated with the user, the digital promotions system 20 advantageously builds a more accurate user-craving profile. This may result in a more accurate and targeted digital promotion, or improve the processing of digital promotions relative to existing digital promotions processing. More particularly, the approach described above and embodied in the digital promotions system 20 may reduce the amount of data to be processed by reducing the amount of un-redeemed digital promotions.

Figure 7:
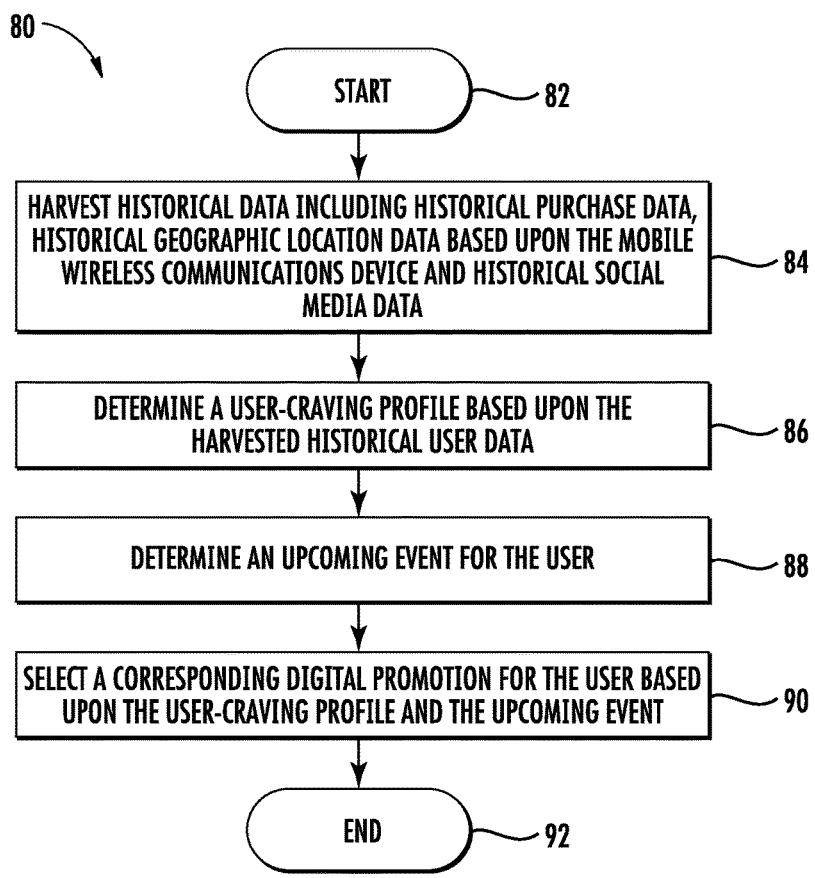
FIG. 7 is a flowchart of a method of processing a digital promotion according to an embodiment.

Referring now to the flowchart 80 in FIG. 7, beginning at Block 82, a method aspect is directed to a method of processing a digital promotion. The method includes, at Block 84, using a processor 42, for example, of a digital promotions server 40 coupled to a memory 41 that stores digital promotions to harvest historical user data that includes historical purchase data, historical geographic location data based upon a mobile wireless communications device, and historical social media data, and determine a user-craving profile based upon the harvested historical user data (Block 86). The method also includes using the processor 42 to determine an upcoming event for the user (Block 88), and select a corresponding digital promotion 43 for the user based upon the user-craving profile and the upcoming event (Block 90). The method ends at Block 92.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotions system comprising:
a mobile wireless communications device associated with a user and comprising a display and an input device; and
a digital promotions server comprising a memory having a plurality of digital promotions stored thereon, and a processor coupled thereto, said processor configured to
harvest historical user data comprising historical purchase data associated with the user, historical geographic location data associated with said mobile wireless communications device, and historical social media data associated with the user,
determine a user-craving profile for the user based upon the harvested historical user data,
determine whether the user is likely to attend an upcoming event based upon the historical user data, the upcoming event having a start-time and a potential outcome associated therewith,
based upon the determination that the user is likely to attend the upcoming event,
select a corresponding digital promotion for the user based upon the user-craving profile and the upcoming event, the corresponding digital promotion having an associated first promotional value,
determine an end-time for the upcoming event and set an expiration time for the corresponding digital promotion, the expiration time occurring prior to the end-time of the upcoming event,
communicate the selected corresponding digital promotion with the expiration time and the first promotional value to the mobile wireless communications device for display on said display prior to the start-time of the upcoming event,
receive a predicted outcome of the upcoming event from the mobile wireless communications device,
based upon the predicted outcome being received prior to the expiration time of the corresponding digital promotion, determine an updated expiration time of the corresponding digital promotion, the updated expiration time occurring after the end-time of the upcoming event,
identify an actual outcome of the upcoming event, and based thereon, determine an updated promotional value for the corresponding digital promotion based upon the predicted outcome relative to the actual outcome of the upcoming event, and
communicate the updated expiration time and updated promotional value to the mobile wireless communications device for displaying on said display with the corresponding digital promotion.

2. The digital promotions system of claim 1 wherein said processor is configured to determine the upcoming event based upon a digital calendar entry associated with the user.

3. The digital promotions system of claim 1 wherein said mobile wireless communications device is configured to determine a current geographic location thereof and communicate the geographic location to said digital promotions server; and wherein said processor is configured to determine the upcoming event based upon the current geographic location.

4. The digital promotions system of claim 1 wherein said processor is configured to generate the user-craving profile by correlating the historical purchase data, the historical geographic location data, and the historical social media data for predicting a likelihood that a product is to be purchased at a given time and a given location.

5. The digital promotions system of claim 4 wherein said processor is configured to determine the associated first promotional value based upon an amount of correlated historical purchase data, historical geographic location data, and historical social media data.

6. The digital promotions system of claim 1 wherein said processor generates the user-craving profile based upon at least one of gender, age of the user, and household income.

7. A digital promotions server comprising:
a memory having a plurality of digital promotions stored thereon; and
a processor coupled to said memory and configured to
harvest historical user data comprising historical purchase data associated with a user, historical geographic location data associated with a mobile wireless communications device associated with the user and historical social media data associated with the user,
determine a user-craving profile for the user based upon the harvested historical user data,
determine whether the user is likely to attend an upcoming event based upon the historical user data, the upcoming event having a start-time and a potential outcome associated therewith,
based upon the determination that the user is likely to attend the upcoming event, select a corresponding digital promotion for the user based upon the user-craving profile and the upcoming event, the corresponding digital promotion having an associated first promotional value, determine an end-time for the upcoming event and set an expiration time for the corresponding digital promotion, the expiration time occurring prior to the end-time of the upcoming event, communicate the selected corresponding digital promotion with the expiration time and the first promotional value to the mobile wireless communications device for display on said display prior to the start-time of the upcoming event, receive a predicted outcome of the upcoming event from the mobile wireless communications device, based upon the predicted outcome being received prior to the expiration time of the corresponding digital promotion, determine an updated expiration time of the corresponding digital promotion, the updated expiration time occurring after the end-time of the upcoming event, identify an actual outcome of the upcoming event, and based thereon, determine an updated promotional value for the corresponding digital promotion based upon the predicted outcome relative to the actual outcome, and communicate the updated expiration time and updated promotional value to the mobile wireless communications device for displaying on said display with the corresponding digital promotion.

8. The digital promotions server of claim 7 wherein said processor is configured to determine the upcoming event based upon a digital calendar entry associated with the user.

9. The digital promotions server of claim 7 wherein said processor is configured to determine the upcoming event based upon a current geographic location determined by and communicated from the mobile wireless communications device.

10. The digital promotions server of claim 7 wherein said processor is configured to generate the user-craving profile by correlating the historical purchase data, the historical geographic location data, and the historical social media data for predicting a likelihood that a product is to be purchased at a given time and a given location.

11. A method of processing a digital promotion comprising:

using a processor coupled to a memory having a plurality of digital promotions stored thereon to harvest, by the processor, historical user data comprising historical purchase data associated with the user, historical geographic location data associated with said mobile wireless communications device, and historical social media data associated with the user, determine, by the processor, a user-craving profile for the user based upon the harvested historical user data, determine, by the processor, whether the user is likely to attend an upcoming event based upon the historical user data, the upcoming event having a start-time and a potential outcome associated therewith, based upon the determination that the user is likely to attend the upcoming event, select, by the processor, a corresponding digital promotion for the user based upon the user-craving profile and the upcoming event, the corresponding digital promotion having an associated first promotional value, determine, by the processor, an end-time for the upcoming event and set an expiration time for the corresponding digital promotion, the expiration time occurring prior to the end-time of the upcoming event, communicate, by the processor, the selected corresponding digital promotion with the expiration time and the first promotional value to the mobile wireless communications device for display on said display prior to the start-time of the upcoming event, receive, by the processor, a predicted outcome of the upcoming event from the mobile wireless communications device, based upon the predicted outcome being received prior to the expiration time of the corresponding digital promotion, determine, by the processor, an updated expiration time of the corresponding digital promotion, the updated expiration time occurring after the end-time of the upcoming event, identify, by the processor, an actual outcome of the upcoming event, and based thereon, determine, by the processor, an updated promotional value for the corresponding digital promotion based upon the predicted outcome relative to the actual outcome, and communicate, by the processor, the updated expiration time and updated promotional value to the mobile wireless communications device for displaying on said display with the corresponding digital promotion.

12. The method of claim 11 wherein using the processor comprises using the processor to determine the upcoming event based upon a digital calendar entry associated with the user.

13. A non-transitory computer readable medium for processing a digital promotion, the computer readable medium comprising computer-executable instructions that, when executed by a processor of a digital promotions server, cause the digital promotions server to perform operations comprising:

harvesting historical user data comprising historical purchase data associated with a user, historical geographic location data associated with a mobile wireless communications device associated with the user, and historical social media data associated with the user, determining a user-craving profile for the user based upon the harvested historical user data, determining whether the user is likely to attend an upcoming event based upon the historical user data, the upcoming event having a start-time and a potential outcome associated therewith, based upon the determination that the user is likely to attend the upcoming event, selecting a corresponding digital promotion for the user based upon the user-craving profile and the upcoming event, the corresponding digital promotion having an associated first promotional value, determining an end-time for the upcoming event and set an expiration time for the corresponding digital promotion, the expiration time occurring prior to the end-time of the upcoming event, communicating the selected corresponding digital promotion with the expiration time and the first promotional value to the mobile wireless communications device for display on said display prior to the start-time of the upcoming event, receiving a predicted outcome of the upcoming event from the mobile wireless communications device, based upon the predicted outcome being received prior to the expiration time of the corresponding digital promotion, determining an updated expiration time of the corresponding digital promotion, the updated expiration time occurring after the end-time of the upcoming event, identifying an actual outcome of the upcoming event, and based thereon, determining an updated promotional value for the corresponding digital promotion based upon the predicted outcome relative to the actual outcome, and communicating the updated expiration time and updated promotional value to the mobile wireless communications device for displaying on said display with the corresponding digital promotion.

14. The non-transitory computer readable medium of claim 13 wherein the computer-executable instructions cause the processor to determine the upcoming event based upon a digital calendar entry associated with the user.

* * * * *